United States Defensive Publication [19] (H) [11] T954,005

Davis et al. [43] Jan. 4, 1977

[54] PROCESS FOR PREPARING CONTAINERS USING BRANCHED POLYESTERS

[76] Inventors: Burns Davis, 2019 Bruce St., Kingsport, Tenn. 37664; James R. Overton, 840 Ridgefields Road; Roger M. Schulken, Jr., 2113 Heatherly Road, both of Kingsport, Tenn. 37660

[21] Appl. No.: 689,224

[22] Filed: May 24, 1976

[51] Int. Cl.[2] ..... B29C 17/07

[52] U.S. Cl. ..... 264/98; 260/75 T

[57] ABSTRACT

Disclosed is a process for preparing containers, such as bottles, using a branched polyester of terephthalic acid, a combination of ethylene glycol and 1,4-cyclohexanedimethanol and a small amount of a polyfunctional branching compound. A molten parison of such polyester is extruded and then expanded in a container mold to form the desired container.

2 Claims, No Sheets Drawing,

9 Pages Specification

The file of this unexamined application may be inspected and copies thereof may be purchased (849 O.G. 1221, Apr. 9, 1968).